(12) United States Patent
Kim et al.

(10) Patent No.: US 9,356,633 B2
(45) Date of Patent: May 31, 2016

(54) APPARATUS AND METHOD FOR RECEIVING MULTIPATH SIGNALS IN WIRELESS COMMUNICATION SYSTEM (71) Applicant: Samsung Electronics Co., Ltd, Gyeonggi-do (KR)

(72) Inventors: Hyun-Cheol Kim, Gyeonggi-do (KR); Myung-Kwang Byun, Gyeonggi-do (KR); Yu-Suk Yun, Seoul (KR); Sung-Kwon Jo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 13/886,151

(22) Filed: May 2, 2013

(65) Prior Publication Data
US 2013/0294548 A1 Nov. 7, 2013

(30) Foreign Application Priority Data
May 2, 2012 (KR) .................. 10-2012-0046362

(51) Int. Cl.
H04L 27/00 (2006.01)
H04L 27/06 (2006.01)
H03D 1/04 (2006.01)
H04B 1/10 (2006.01)
H04L 25/02 (2006.01)
H04B 1/712 (2011.01)

(52) U.S. Cl.
CPC .................. H04B 1/10 (2013.01); H04B 1/712 (2013.01); H04L 25/0224 (2013.01)

(58) Field of Classification Search
USPC ......... 375/130–153, 316, 324, 325, 340, 341, 375/343, 346, 350, 219, 220, 221, 22, 229, 375/232–233, 240.26–240.27, 284, 285, 375/295, 296, 299, 348, 349, 222, 240.23, 375/240.24, 259, 268, 271, 326, 3, 27, 342, 375/354, 362; 379/406.9, 406.1, 406.06, 379/406.08

See application file for complete search history.

(56) References Cited

U.S. PATENT DOCUMENTS

| | | | |
|---|---|---|---|
| 8,339,930 B2* | 12/2012 | Gore et al. | |
| 2003/0016646 A1* | 1/2003 | Miya | 370/342 |
| 2009/0060102 A1* | 3/2009 | Wong et al. | |
| 2010/0062708 A1* | 3/2010 | Sangiamwong et al. | 455/24 |
| 2011/0255573 A1* | 10/2011 | Guess et al. | 375/148 |
| 2011/0292974 A1* | 12/2011 | Lamba et al. | 375/148 |
| 2012/0113973 A1* | 5/2012 | Kim et al. | 370/342 |
| 2012/0207254 A1* | 8/2012 | Park et al. | 375/343 |
| 2013/0287135 A1* | 10/2013 | Cheng; Hongbing | |
| 2014/0133542 A1* | 5/2014 | Kangas; An | 375/230 |

* cited by examiner

Primary Examiner — Linda Wong (57) ABSTRACT

Provided are an apparatus and method for receiving a multipath signal in a wireless communication system. The apparatus includes a weighting block for receiving an estimated channel gain value output from a channel estimator and outputting an estimated weighted channel gain value and a compensator unit for receiving the estimated weighted channel gain value, reflecting the weight, and compensating, for an estimated channel gain.

22 Claims, 9 Drawing Sheets

APPARATUS AND METHOD FOR RECEIVING MULTIPATH SIGNALS IN WIRELESS COMMUNICATION SYSTEM

CROSS-REFERENCE TO RELATED APPLICATION(S) AND CLAIM OF PRIORITY

The present application is related to and claims priority under 35 U.S.C. §119 to an application No. 10-2012-0046362, filed in the Korean Intellectual Property Office on May 2, 2012, the contents of which are incorporated herein by reference.

TECHNICAL FIELD

The present disclosure relates generally to an apparatus and method for receiving a multipath signal, and in particular, to an apparatus and method for receiving a multipath signal in a wireless communication system.

BACKGROUND

In general, a receiver of a wireless communication system receives signals through a multipath at different times, demodulates the received signals in respective paths, removes a time delay, combines signals of the respective paths, and performs decoding. Herein, an apparatus performing independent demodulation and combination on a multipath signal is generally referred to as a rake receiver.

A conventional rake receiver includes a channel estimator that estimates a channel of each path. The conventional rake receiver compensates for a channel gain value output from the channel estimator, and performs Maximum Ratio Combining (MRC). The MRC has the best effect when there is no estimation error in the channel gain value output from the channel estimator.

However, the channel estimator of the conventional rake receiver has an estimation error in the channel gain value according to a moving speed of a terminal and a Signal-to-Noise Ratio (SNR) of an input signal. Therefore, there is a need to apply a weight capable of maximizing an SNR of a rake receiver, considering an estimation error in the channel gain value output from a channel estimator.

SUMMARY

To address the above-discussed deficiencies of the prior art, it is a primary object to provide at least the advantages below. Accordingly, an object of the present disclosure is to provide an apparatus and method for applying a weight capable of maximizing an SNR to a channel estimator in consideration of an estimation error of the channel estimator.

Another object of the present disclosure is to provide an apparatus and method for improving the reception performance of a receiver by applying a weight capable of maximizing an SNR to a channel estimator.

According to an aspect of the present disclosure, an apparatus for receiving a multipath signal in a wireless communication system includes: a weighting block for receiving an estimated channel gain value output from a channel estimator and outputting an estimated weighted channel gain value; and a compensator unit for receiving the estimated weighted channel gain value, reflecting the weight, and compensating for an estimated channel gain.

According to another aspect of the present disclosure, a method for receiving a multipath signal in a wireless communication system includes: receiving an estimated channel gain value and outputting an estimated weighted channel gain value; and receiving the estimated weighted channel gain value, reflecting the weight, and compensating for an estimated channel gain.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication technologies. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, like reference numerals denote like element throughout the specification and drawings.

Figure 1:
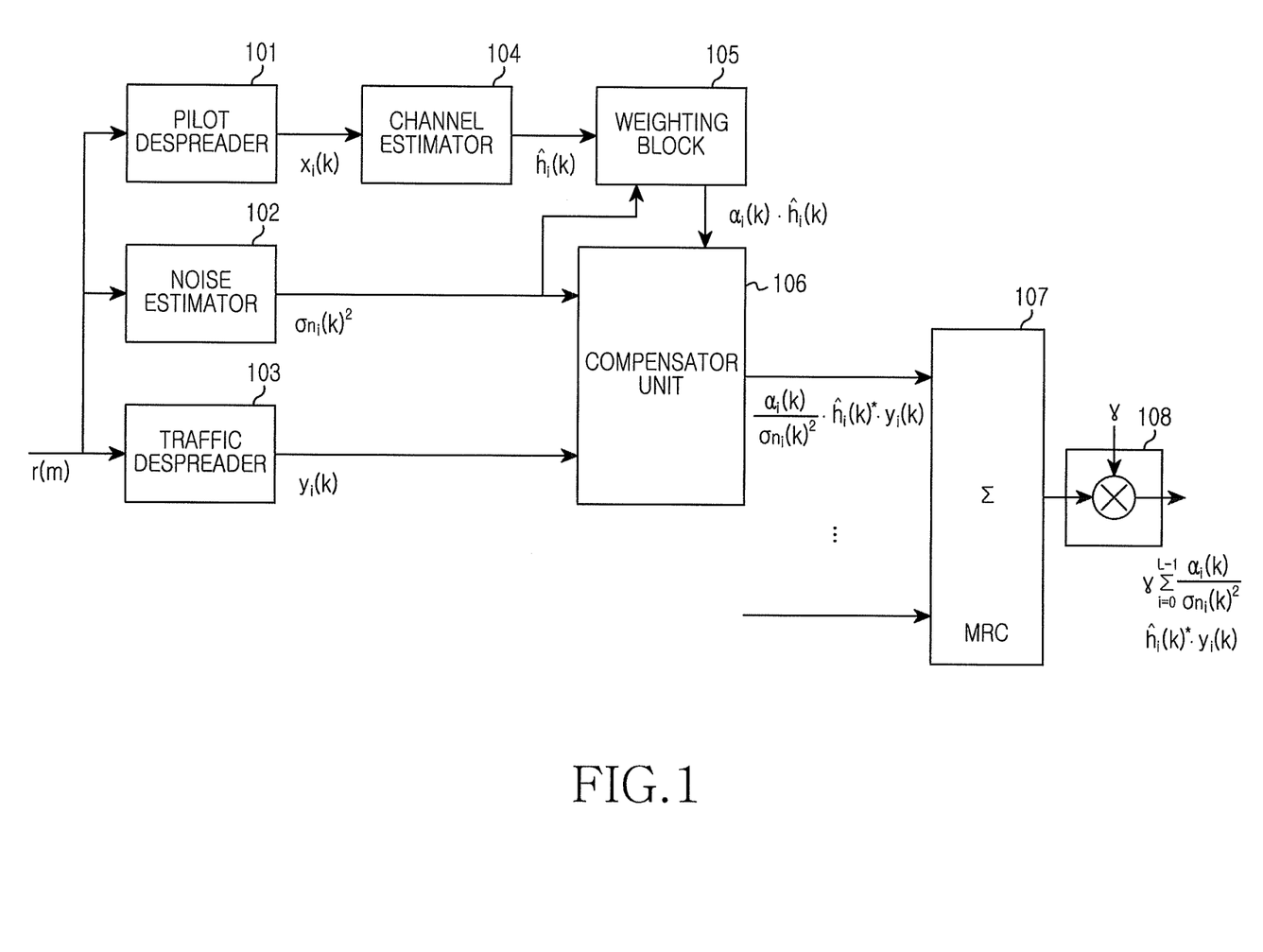
FIG. 1 illustrates an overall configuration of a receiver according to the present disclosure.

FIG. 1 illustrates an overall configuration of a receiver according to one embodiment of the present disclosure. As illustrated in FIG. 1, a receiver according to the present disclosure can include a pilot despreader 101, a noise estimator 102, a traffic despreader 103, a channel estimator 104, a weighting block 105, a compensator unit 106, an Maximum Ratio Combining (MRC) unit 107, and a multiplier 108.

The pilot despreader 101 receives a pilot signal among a received signal and despreads the received pilot signal. Specifically, the pilot despreader 101 outputs a symbol-based signal $x_i(k)$ by despreading a received chip-based signal $r(m)$ by a pilot spreading factor.

The noise estimator 102 estimates a noise contained in the received signal. Specifically, the noise estimator 102 estimates the received chip-based signal $r(m)$ to outputs a noise estimation value $\sigma_{n_i}(k)^2$ that will be used in relevant signals. In embodiments of the present disclosure, it is assumed that the noise estimation value is equal to a noise dispersion $\sigma_{n_i}(k)^2$.

The traffic despreader 103 despreads a traffic signal among the received signal. Specifically, the traffic despreader 103 produces a signal $y_i(k)$ by despreading the received chip-based signal $r(m)$ by a traffic data spreading factor. Herein, the traffic data spreading factor and the pilot spreading factor can have different values. However, in the present disclosure, for the convenience of equation derivation, it is assumed that the traffic data spreading factor and the pilot spreading factor have the same value. Herein, the despread traffic signal $y_i(k)$ is determined according to the following equation:

$$y_i(k) = \gamma h_i(k) d(k) + n_i(k) \quad (1)$$

where $\gamma$ denote the ratio of the pilot to the traffic after despreading, and $n_i(k)$ denotes a noise term.

The noise term $n_i(k)$ has a dispersion according to the following equation:

$$E[n_i(k)^2] = \sigma_{n_i}(k)^2 \quad (2)$$

Herein, for simple equation derivation, it is assumed that a noise of a despread pilot used for input of a channel estimation is also scaled to have the same dispersion as Equation (2).

The channel estimator 104 receives the symbol-based signal $x_i(k)$ despread by the pilot despreader 101 and estimates a channel. Specifically, the channel estimator 104 receives a despread pilot signal, estimates a channel, and outputs an estimated channel gain value $\hat{h}_i(k)$. Herein, the estimated channel gain value $\hat{h}_i(k)$ is determined according to the following equation:

$$\hat{h}_i(k) = W^T X_i(k) = \sum_{l=-A}^{A} w(l) x_i(k+l) \quad (3)$$

where $W^T$ denotes a matrix obtained by approximating the channel estimator by an FIR filter having a sufficiently larger tap number (=2A+1), $x_i(k)$ denotes an input signal of the channel estimator for the $i^{th}$ path, and $w(l)$ denotes the $l^{th}$ channel estimation coefficient when the channel estimator is approximated by the FIR filter.

The $x_i(k)$ included in Equation (3) is determined according to the following equation:

$$x_i(k) = h_i(k) + n_{x_i}(k) \quad (4)$$

where $h_i(k)$ denotes a channel gain value, and $n_{x_i}(k)$ denotes a noise term.

The noise term $n_{x_i}(k)$ has a dispersion according to the following equation:

$$E[n_{x_i}(k)^2] = \sigma_{n_i}(k)^2 \quad (5)$$

Also, the $W^T$ is determined according to the following equation:

$$W = \begin{bmatrix} w(A) \\ \vdots \\ w(0) \\ \vdots \\ w(-A) \end{bmatrix} \quad (6)$$

where $w(l)$ denotes the $l^{th}$ channel estimation coefficient when the channel estimator is approximated by the FIR filter.

The weighting block 105 receives the estimated channel gain value output from the channel estimator 104 and outputs an estimated weighted channel gain value. More specifically, the weighting block 105 receives the despread pilot signal from the pilot despreader 101 and the estimated channel gain value from the channel estimator 104 and produces an estimated weighted channel gain value. That is, when a weight is $\alpha_i(k)$, the weighting block 105 outputs a value $\alpha_i(k) \hat{h}_i(k)$ that is the product of the estimated channel gain value and the weight. Therefore, the weighting block 105 produces an estimated weighted channel gain value by reflecting an error of the channel gain estimated by the channel estimator 104. More specifically, a channel estimator of a conventional receiver has an estimation error in the estimated channel gain value depending on a moving speed of a terminal and a Signal-to-Noise Ratio (SNR) of an input signal. However, by using the weighting block 105, the present disclosure can apply a weight, thereby allowing to maximize an SNR of a rake receiver, considering an estimation error in the estimated channel gain value output from the channel estimator 104 before the compensator unit 106 compensates for the estimated channel gain value.

The compensator unit 106 receives the estimated weighted channel gain value, reflects the weight, and compensates for an estimated channel gain. More specifically, the compensator unit 106 receives the estimated noise values from the noise estimator 102, the despread traffic signal from the traffic despreader 103 and the estimated weighted channel gain value from the weighting block 105, reflects the weight, and compensates for an estimated channel gain. That is, the compensator unit 106 produces a channel gain-compensated value determined according to the following equation:

$$\frac{\alpha_i(k)}{\sigma_{n_i}(k)^2} \hat{h}_i(k)^* y_i(k) \quad (7)$$

where $\alpha_i(k)$ denotes the weight, $\sigma_{n_i}(k)^2$ denotes the estimated noise value, $\hat{h}_i(k)^*$ denotes a complex conjugate value of the estimated channel gain value, and $y_i(k)$ denotes the despread traffic signal.

The MRC unit 107 receives channel gain-compensated values output from a plurality of compensator unit 106, and adds up the channel gain-compensated values by MRC.

The multiplier 108 produces a final value of the receiver by multiplying the MRC output value by the ratio ($\gamma$) of the despread pilot to the despread traffic. The final value of the receiver is determined according to the following equation:

$$z_i(k) = \gamma \sum_{i=0}^{L-1} \frac{\alpha_i(k)}{\sigma_{n_i}(k)^2} \hat{h}_i(k)^* y_i(k) \quad (8)$$

where $\alpha_i(k)$ denotes the weight, $\sigma_{n_i}(k)^2$ denotes the estimated noise value, $\hat{h}_i(k)^*$ denotes a complex conjugate value of the estimated channel gain value, and $y_i(k)$ denotes the despread traffic signal.

It can be seen from Equation (8) that the weight multiplied to the estimated channel gain value estimated by the weighting block 105 is included in the final value of the receiver. That is, since the final value of the receiver includes the weight multiplied to the estimated channel gain value, the present disclosure reflects an error of the channel gain value estimated by the channel estimator 104.

A process for deriving the weight $\alpha_i(k)$ will be described below in detail. First, Equation (1) is developed as follows:

$$z_i(k) = \sum_{i=0}^{L-1} \frac{\alpha_i(k)}{\sigma_{n_i}(k)^2} \gamma(\beta_i h_i(k)^* + e_i(k)^*)(\gamma h_i(k)d(k) + n_i(k)) \qquad (9)$$

$$= \sum_{i=0}^{L-1} \frac{\alpha_i(k)}{\sigma_{n_i}(k)^2} (\gamma^2 \beta_i |h_i(k)|^2 d(k) + \gamma \beta_i h_i(k)^* n_i(k) +$$

$$\gamma h_i(k) d(k) e_i(k)^* + \gamma e_i(k)^* n_i(k))$$

$$= \sum_{i=0}^{L-1} \alpha_i(k)(s_{g_i}(k)d(k) + n_{g_i}(k))$$

$$= \sum_{i=0}^{L-1} \alpha_i(k) g_i(k)$$

$$= \alpha(k)^T g(k)$$

where $\sigma_{n_i}(k)^2$ denotes the estimated noise value, $\gamma$ denotes the ratio of the pilot to the traffic after despreading, $h_i(k)$ denotes the channel gain value, $h_i(k)^*$ denotes a complex conjugate value of the channel gain value, $e_i(k)^*$ denotes a complex conjugate value of the noise term, $n_i(k)$ denotes the noise term, and $d(k)$ denotes transmitted data.

The $\alpha(k)$ and $g(k)$ in Equation (9) can be expressed respectively as follows:

$$\alpha(k) = [\alpha_0(k) \ldots \alpha_i(k) \ldots \alpha_{L-1}(k)]^T \qquad (10)$$

$$g(k) = \begin{bmatrix} g_0(k) \\ \ldots \\ g_i(k) \\ \ldots \\ g_{L-1}(k) \end{bmatrix} \qquad (11)$$

$$= \begin{bmatrix} s_{g_0}(k) \\ \ldots \\ s_{g_i}(k) \\ \ldots \\ s_{g_{L-1}}(k) \end{bmatrix} d(k) + \begin{bmatrix} n_{g_0}(k) \\ \ldots \\ n_{g_i}(k) \\ \ldots \\ n_{g_{L-1}}(k) \end{bmatrix}$$

The $\alpha(k)$ maximizing an SNR of a signal in the same form as the $g(k)$ of Equation (11) can be expressed as follows:

$$\alpha(k) = R_{n,n}(k)^{-1} P(k) \qquad (12)$$

The $R_{n,n}(k)$ in Equation (12) can be expressed as follows:

$$R_{n,n}(k) = \begin{bmatrix} E[n_{g_0}(k)n_{g_0}(k)^*] & E[n_{g_0}(k)n_{g_1}(k)^*] & \ldots & E[n_{g_0}(k)n_{g_{L-1}}(k)^*] \\ E[n_{g_1}(k)n_{g_0}(k)^*] & E[n_{g_1}(k)n_{g_1}(k)^*] & \ldots & E[n_{g_1}(k)n_{g_{L-1}}(k)^*] \\ \vdots & & \ddots & \vdots \\ E[n_{g_{L-1}}(k)n_{g_0}(k)^*] & E[n_{g_{L-1}}(k)n_{g_1}(k)^*] & \ldots & E[n_{g_{L-1}}(k)n_{g_{L-1}}(k)^*] \end{bmatrix} \qquad (13)$$

Herein, since the noises of the respective paths are independent of each other, Equation (13) can be expressed as follows:

$$R_{n,n}(k) = \begin{bmatrix} E[n_{g_0}(k)n_{g_0}(k)^*] & 0 & \ldots & 0 \\ 0 & E[n_{g_1}(k)n_{g_1}(k)^*] & \ldots & 0 \\ \vdots & & \ddots & \vdots \\ 0 & 0 & \ldots & E[n_{g_{L-1}}(k)n_{g_{L-1}}(k)^*] \end{bmatrix} \qquad (14)$$

Herein, since Equation (14) is a diagonal matrix in which elements other than diagonal components are all 0, an inverse matrix is expressed as follows:

$$R_{n,n}^{-1} = \begin{bmatrix} \frac{1}{E[n_{g_0}(k)n_{g_0}(k)^*]} & 0 & \ldots & 0 \\ 0 & \frac{1}{E[n_{g_1}(k)n_{g_1}(k)^*]} & \ldots & 0 \\ \vdots & & \ddots & \vdots \\ 0 & 0 & \ldots & \frac{1}{E[n_{g_{L-1}}(k)n_{g_{L-1}}(k)^*]} \end{bmatrix} \qquad (15)$$

Also, the $P(k)$ of Equation (12) can be expressed as follows:

$$P(k) = E[g(k)d(k)^*] = [s_{g_0}(k) \ldots s_{g_i}(k) \ldots s_{g_{L-1}}(k)]^T \qquad (16)$$

By substituting Equation (15) and Equation (16) in Equation (12), the weight $\alpha_i(k)$ can be determined according to the following equation:

$$\alpha_i(k) = \frac{\gamma^2 \beta_i \frac{|h_i(k)|^2}{\sigma_{n_i}(k)^2}}{\frac{1}{\sigma_{n_i}(k)^4} \gamma^2 [\beta_i^2 |h_i(k)|^2 \sigma_{n_i}(k)^2 + |h_i(k)|^2 \sigma_{e_i}(k)^2 + \sigma_{e_i}(k)^2 \sigma_{n_i}(k)^2]} \qquad (17)$$

$$= \frac{\beta_i |h_i(k)|^2}{\beta_i^2 |h_i(k)|^2 + |h_i(k)|^2 \frac{\sigma_{e_i}(k)^2}{\sigma_{n_i}(k)^2} + \sigma_{e_i}(k)^2}$$

Herein, since $\sigma_{e_i}(k)^2$ is a noise dispersion output from the channel estimator and is much smaller than $\sigma_{n_i}(k)^2$ that is a noise dispersion of the input of the channel estimator, it can be approximated as Equation (18). That is, since a numerator of $$\frac{\sigma_{e_i}(k)^2}{\sigma_{n_i}(k)^2}$$

is much smaller than a denominator of $$\frac{\sigma_{e_i}(k)^2}{\sigma_{n_i}(k)^2},$$

$$\frac{\sigma_{e_i}(k)^2}{\sigma_{n_i}(k)^2}$$

can converge to 0.

$$\alpha_i(k) \cong \frac{\beta_i |h_i(k)|^2}{\beta_i^2 |h_i(k)|^2 + \sigma_{e_i}(k)^2} \qquad (18)$$

When Equation (18) is arranged as an implementable equation, it can be expressed as follows:

$$\alpha_i(k) \cong \frac{\beta_i |h_i(k)|^2}{\beta_i^2 |h_i(k)|^2 + \sigma_{e_i}(k)^2} = \frac{\mathrm{Re}\{E[h_i(k)\hat{h}_i(k)^*]\}}{E[|\hat{h}_i(k)|^2]} \qquad (19)$$

When Equation (19) is transformed into an equation of the input and output of the channel estimator by using Equation (3) and Equation (4), it can be expressed as follows:

$$\alpha_i(k) \cong \frac{\mathrm{Re}\{E[h_i(k)\hat{h}_i(k)^*]\}}{E[|\hat{h}_i(k)|^2]} = \frac{\mathrm{Re}\{E[x_i(k)\hat{h}_i(k)^*] - E[n_{x_i}(k)\hat{h}_i(k)^*]\}}{E[|\hat{h}_i(k)|^2]} = \frac{\mathrm{Re}\{E[x_i(k)\hat{h}_i(k)^*]\} - w(0)\sigma_{n_i}(k)^2}{E[|\hat{h}_i(k)|^2]} \qquad (20)$$

where $\alpha_i(k)$ denotes a weight, $\mathrm{Re}\{E[x_i(k)\hat{h}_i(k)^*]\}$ denotes a real number of the average of the product of the despread pilot signal $x_i(k)$ and the complex conjugate value $\hat{h}_i(k)^*$ of the estimated channel gain value, $w(0)\sigma_{n_i}(k)^2$ denotes a noise component, $W(0)$ denotes a $0^{th}$ coefficient, $\sigma_{n_i}(k)^2$ denotes a noise estimation value, and $E[|\hat{h}_i(k)|^2]$ denotes an average value of the power of the estimated channel gain value $\hat{h}_i(k)$.

Figure 2:
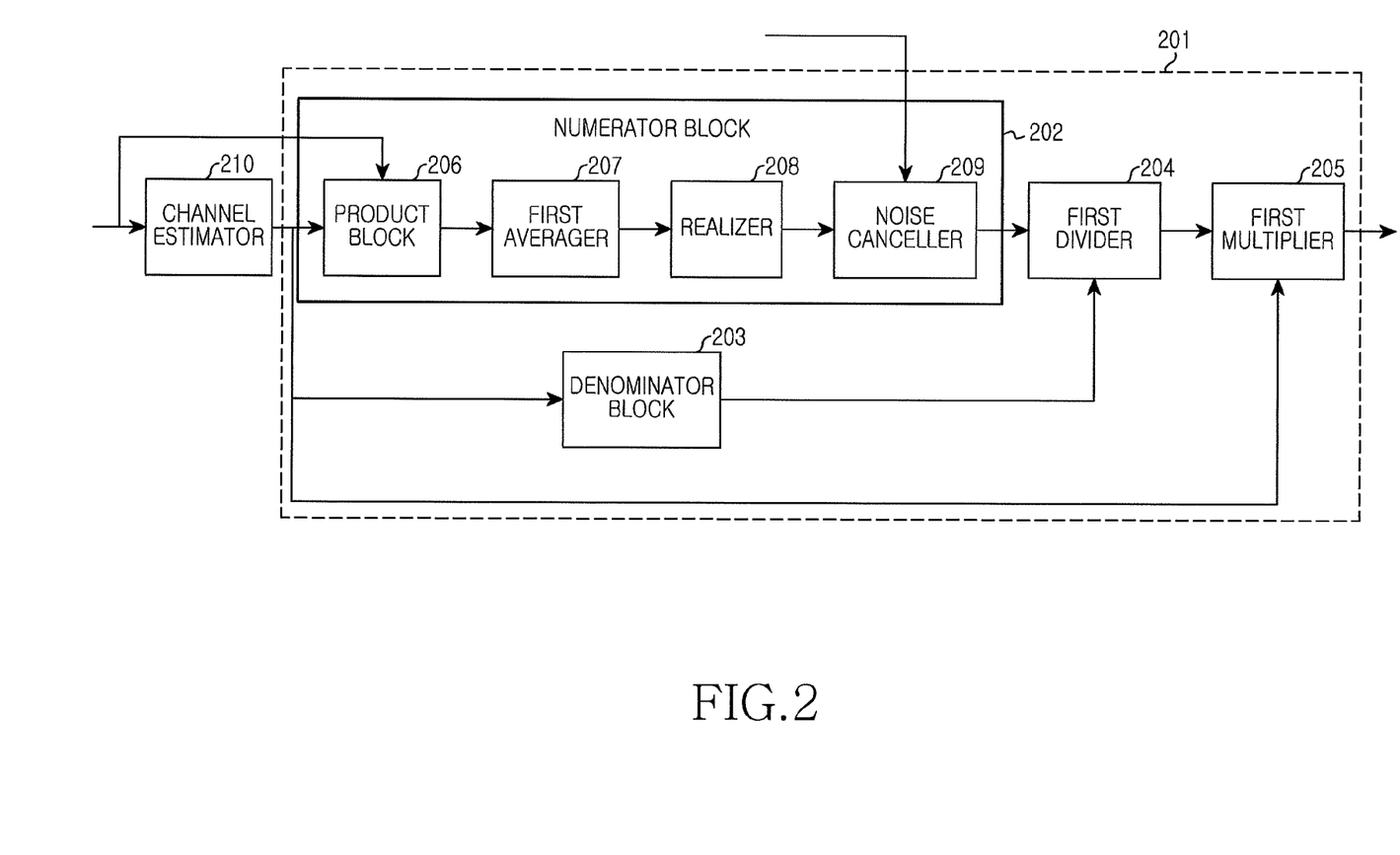
FIG. 2 illustrates a configuration of a weighting block according to an embodiment of the present disclosure.

FIG. 2 is a diagram illustrating an embodiment of a configuration of a weighting block according to the present disclosure. As illustrated in FIG. 2, a weighting block 201 according to the present disclosure can include a numerator block 202, a denominator block 203, a first divider 204, and a first multiplier 205. The numerator block 202 may include a product block 206, a first averager 207, a realizer 208, and a noise canceller 209.

The numerator block 202 outputs a numerator value of a weight. Specifically, the numerator block 202 receives a despread pilot signal output from a pilot despreader (not illustrated), an estimated channel gain value output from a channel estimator 210, and a noise estimation value output from a noise estimator (not illustrated), and produces a numerator value of a weight. First, the product block 206 included in the numerator block 202 receives an estimated channel gain value output from the channel estimator 210 and a despread pilot signal output from the pilot despreader (not illustrated), and outputs the product of the despread pilot signal and a complex conjugate value of the estimated channel gain value.

The first averager 207 receives the value output from the product block 206, and obtains the average of the received value. More specifically, the first averager 207 receives the product of the despread pilot signal and the complex conjugate value of the estimated channel gain value output from the product block 206, and obtains the average of the product of the despread pilot signal and the complex conjugate value of the estimated channel gain value.

The realizer 208 receives the value output from the first averager 207 and outputs the average of the received value. The noise canceller 209 receives the value output from the realizer 208 and the noise estimation value output from the noise estimator (not illustrated), and cancels a noise component included in the numerator value of the weight. Specifically, the noise canceller 209 obtains a real number of the average of the product of the despread pilot signal and the complex conjugate value of the estimated channel gain value output from the realizer 208, receives the noise estimation value from the noise estimator (not illustrated), and cancels a noise component.

The denominator block 203 receives the estimated channel gain value from the channel estimator 210, and outputs a denominator value of a weight. Herein, the weight may be defined as a value that is multiplied to the estimated channel gain value in order to compensate for an error of the channel gain value estimated by the channel estimator 210. A detailed equation may be defined according to Equation (20) described in detail with reference to FIG. 1.

The first divider 204 receives the value output from the numerator block 202 and the value output from the denominator block 203, and produces a weight reflecting the error estimated by the channel estimator 210. More specifically, the first divider 204 divides the value produced from the numerator block 202 by the value produced from the denominator block 203, and outputs a weight reflecting the estimated error.

The first multiplier 205 receives the channel gain value estimated by the channel estimator 210 and the value output from the first divider 204, and produces an estimated weighted channel gain value. More specifically, the first multiplier 205 receives the weight reflecting the estimated error from the first divider 204 and the estimated channel gain value from the channel estimator 210, multiplies the received respective values, and outputs an estimated weighted channel gain value.

As described above, the weighting block 201 according to the present disclosure reflects an error of the channel gain estimated by the channel estimator 210, and outputs the estimated weighted channel gain value. More specifically, a channel estimator of a conventional receiver has an estimation error in the estimated channel gain value depending on a moving speed of a terminal and a Signal-to-Noise Ratio (SNR) of an input signal. However, by using the weighting block 201, the present disclosure can apply a weight, thereby allowing to maximize an SNR of a rake receiver, considering an estimation error in the estimated channel gain value produced from the channel estimator 210 before a compensator unit (not illustrated) compensates for the estimated channel gain value.

Figure 3:
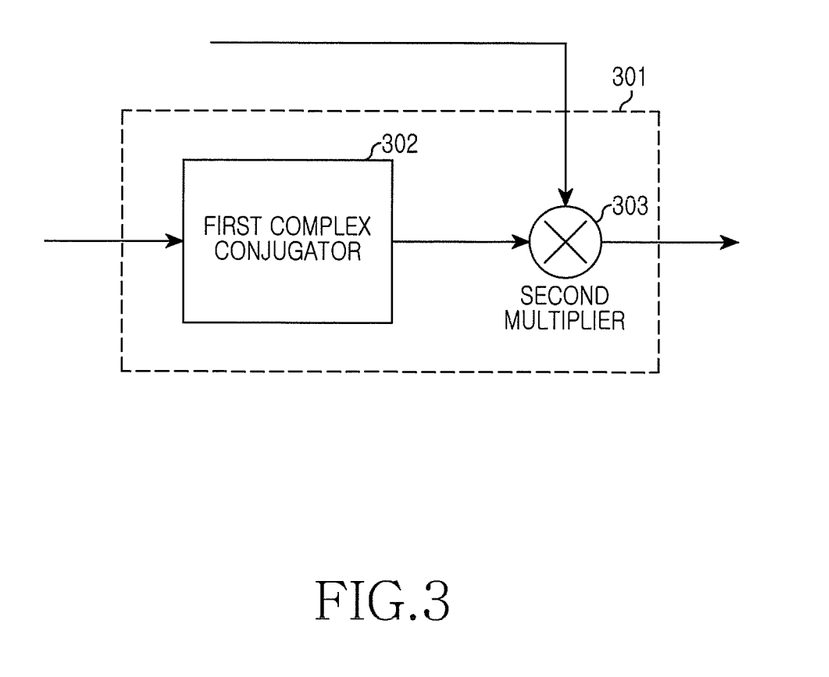
FIG. 3 illustrates an embodiment of a configuration of a product block according to the present disclosure.

FIG. 3 illustrates a configuration of a product block according to an embodiment of the present disclosure. As illustrated in FIG. 3, a product block 301 according to the present disclosure may include a first complex conjugator 302 and a second multiplier 303.

The product block 301 receives an estimated channel gain value and a despread pilot signal, and outputs the product of the received respective values. More specifically, the product block 301 receives an estimated channel gain value from a channel estimator (not illustrated) and a despread pilot signal from a pilot despreader (not illustrated), and outputs the product of the estimated channel gain value and the despread pilot signal.

The first complex conjugator 302 receives an estimated channel gain value from the channel estimator (not illustrated), and outputs a complex conjugate value of the estimated channel gain value.

The second multiplier 303 receives one value from the first complex conjugator 302 and another value from the pilot despreader (not illustrated), and outputs the product of the received respective values. More specifically, the second multiplier 303 receives a complex conjugate value of the estimated channel gain value from the first complex conjugator 302 and the despread pilot signal from the pilot despreader (not illustrated), and outputs the product of the complex conjugate value of the estimated channel gain value and the despread pilot signal.

Thereafter, the value output from the product block 301 is input to a first averager (not illustrated). More specifically, the product of the complex conjugate value of the estimated channel gain value and the despread pilot signal is produced at the product block 301 and is fed to the first averager (not illustrated).

Figure 4:
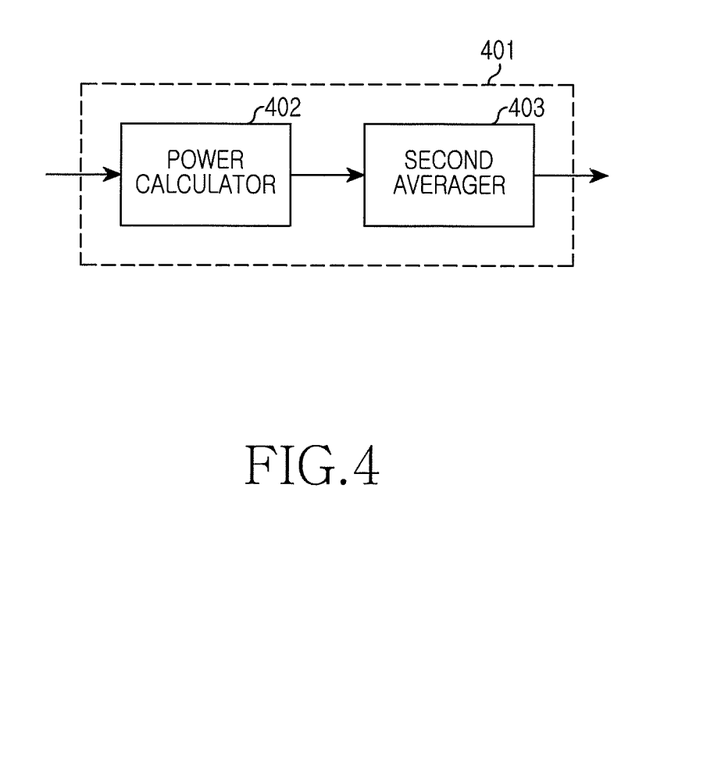
FIG. 4 illustrates an embodiment of a configuration of a denominator block according to the present disclosure.

FIG. 4 illustrates a configuration of a denominator block according to an embodiment of the present disclosure. As illustrated in FIG. 4, a denominator block 401 according to the present disclosure can include a power calculator 402 and a second averager 403.

The denominator block 401 receives an estimated channel gain value and produces a denominator value of a weight. More specifically, the denominator block 401 receives an estimated channel gain value from a channel estimator (not illustrated), and outputs a denominator value of a weight. Herein, the weight can be defined as a value that is multiplied to the estimated channel gain value in order to compensate for an error of the channel gain value estimated by the channel estimator 210. A detailed equation may be defined according to Equation (20) described in detail with reference to FIG. 1.

The power calculator 402 receives an estimated channel gain value and calculates the power of the estimated channel gain value. More specifically, the power calculator 402 receives an estimated channel gain value from the channel estimator (not illustrated), and calculates and outputs the power of the estimated channel gain value.

The second averager 403 obtains and outputs the average of the power value output from the power calculator 402. Specifically, the second averager 403 receives the power value output from the power calculator 402, and calculates and outputs the average of the received power value. That is, the value output through the second averager 403 is the denominator value of the weight.

Thereafter, the denominator value of the weight output from the denominator block 401 is provided to a first divider (not illustrated), which produces the weight.

Figure 5:
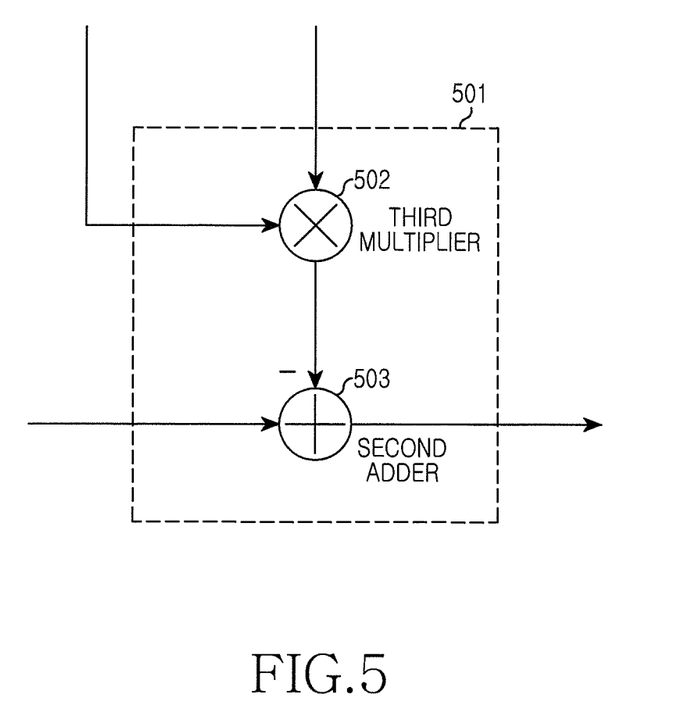
FIG. 5 illustrates an embodiment of a configuration of a noise canceller according to the present disclosure.

FIG. 5 illustrates a configuration of a noise canceller according to an embodiment of the present disclosure. As illustrated in FIG. 5, a noise canceller 501 according to the present disclosure can include a third multiplier 502 and a second adder 503.

The noise canceller 501 can be included in a numerator block (not illustrated). The noise canceller 501 receives a value from a realizer (not illustrated) included in the numerator block (not illustrated) and a noise estimation value from a noise estimator (not illustrated), and cancels a noise component included in a numerator value of a weight. That is, the noise canceller 501 provides a first adder (not illustrated) with a value output by cancelling a noise component included in a numerator value of a weight.

The third multiplier 502 included in the noise canceller 501 receives a noise estimation value from the noise estimator (not illustrated), and outputs a value multiplied by a relevant coefficient.

The second adder 503 receives a value output from a realizer (not illustrated) and a minus value of a value from the third multiplier, adds the received respective values, and cancels a noise component included in a numerator value of a weight.

Thereafter, the value produced from the noise canceller 501, which is the numerator value of the weight, is provided to the first adder (not illustrated), which produces the weight. A detailed equation is determined according to Equation (20) as described in detail with reference to FIG. 1.

Figure 6:
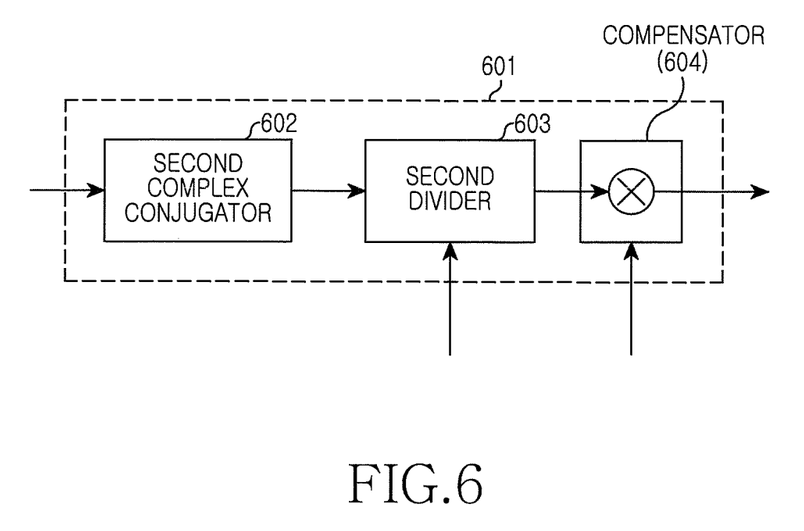
FIG. 6 illustrates an embodiment of a configuration of a compensator unit according to the present disclosure.

FIG. 6 is illustrates an embodiment of a configuration of a compensator unit according to the present disclosure. As illustrated in FIG. 6, a compensator unit 601 according to the present disclosure can include a second complex conjugator 602, a second divider 603, and a compensator 604.

The compensator unit 601 receives an estimated weighted channel gain value, reflects a weight, and compensates for an estimated channel gain. More specifically, the compensator unit 610 receives an estimated weighted channel gain value from a weighting block (not illustrated), reflects a weight, compensates for an estimated channel gain, and provides the result to an MRC unit (not illustrated).

The second complex conjugator 602 receives an estimated weighted channel gain value and outputs a complex conjugate value. More specifically, the second complex conjugator 602 receives an estimated weighted channel gain value from the weighting block (not illustrated), and outputs a complex conjugate number of the estimated weighted channel gain value.

The second divider 603 receives a value from the second complex conjugator 602 and a noise estimation value from a noise estimator (not illustrated), and outputs a value obtained by dividing the value produced at the second complex conjugator 602 by the noise estimation value produced at the noise estimator (not illustrated).

The compensator 604 receives one value from the second divider and another value from a traffic despreader (not illustrated), multiplies the received respective values, and outputs an estimated channel gain compensation value.

That is, a conventional receiver includes a channel estimator that estimates a channel of each path. The conventional receiver compensates for a channel gain value output from the channel estimator, and performs Maximum Ratio Combining (MRC). The MRC has the best effect when there is no estimation error in the channel gain value output from the channel estimator. However, the channel estimator of the conventional receiver has an estimation error in the channel gain value according to a moving speed of a terminal and a Signal-to-Noise Ratio (SNR) of an input signal. Therefore, although a compensator unit compensates for a channel gain value, the conventional receiver cannot compensate for an error generated in the channel estimator. However, the present disclosure can maximize an SNR by applying a weight, thereby allowing to maximize an SNR of a rake receiver, considering an estimation error in the channel gain value produced at the channel estimator in order to compensate for an error generated in the channel estimator.

Figure 7:
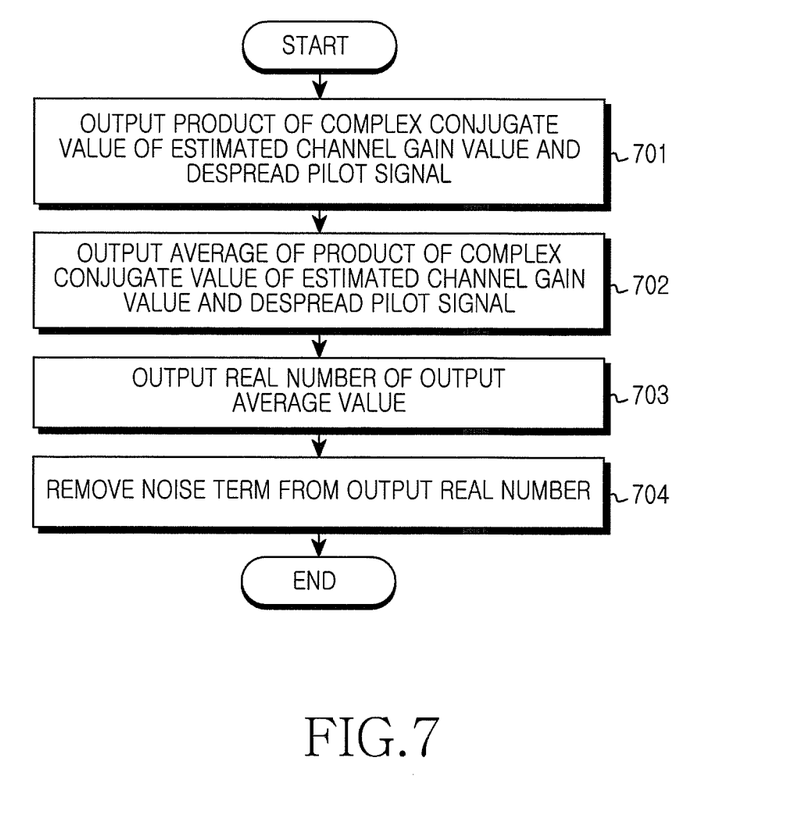
FIG. 7 is a flow diagram illustrating a process for outputting a numerator value of a weight according to an embodiment of the present disclosure.

FIG. 7 is illustrates a process for producing a numerator value of a weight according to an embodiment of the present disclosure. As illustrated in FIG. 7, a value equal to the product of a complex conjugate value of an estimated channel gain and a despread pilot signal is produced in step 701. First, the first complex conjugator receives an estimated channel gain value from the channel estimator, and outputs a complex conjugate value of the estimated channel gain value. Thereafter, the second multiplier receives one value from the first complex conjugator and another value output from the pilot despreader, and outputs the product of the received respective values. More specifically, the second multiplier receives a complex conjugate value of the estimated channel gain value from the first complex conjugator and the despread pilot signal from the pilot despreader, and outputs the product of the complex conjugate value of the estimated channel gain value and the despread pilot signal.

Thereafter, the average of the product of the complex conjugate value of the estimated channel gain value and the despread pilot signal is produced in step 702. More specifically, the first averager receives the value from the second multiplier and outputs the average of the received value. In other words, the first averager receives the product of the despread pilot signal and the estimated channel gain value from the second multiplier, and outputs the average of the received values.

After the average of the product of the complex conjugate value of the channel gain and the despread pilot signal is produced, a real number of the output average value is produced in step 703. More specifically, the realizer receives the average of the product of the complex conjugate value of the channel gain and the despread pilot signal from the first averager, and outputs a real number of the output average value.

After the real number of the output average value is output, a noise term is removed from the output real number in step 704. That is, the noise canceller receives the value from the realizer, and cancels a noise component included in a numerator value of a weight. More specifically, the third multiplier receives a noise estimation value from the noise estimator, and outputs a value multiplied by a relevant coefficient. Thereafter, the second adder receives the value from the realizer and a minus value of the value from the third multiplier, adds the received respective values, and cancels a noise component included in the numerator value of the weight. Thereafter, the process for producing the numerator of the weight is ended.

Figure 8:
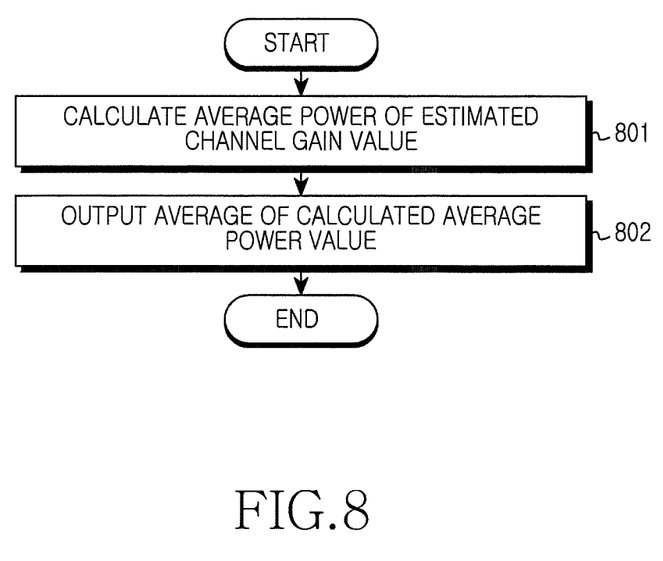
FIG. 8 is a flow diagram illustrating a process for outputting a denominator value of a weight according to an embodiment of the present disclosure.

FIG. 8 is a flow diagram illustrating a process for producing a denominator value of a weight according to an embodiment of the present disclosure. First, the denominator block constituting a denominator of a weight receives an estimated channel gain value and outputs a denominator value of a weight. More specifically, the denominator block receives an estimated channel gain value from the channel estimator, and outputs a denominator value of a weight. Herein, the weight may be defined as a value that is multiplied to the estimated channel gain value in order to compensate for an error of the channel gain value estimated by the channel estimator. The average power of the estimated channel gain value is calculated as illustrated in FIG. 8 in step 801. More specifically, the power calculator receives an estimated channel gain value output from the channel estimator, and calculates and outputs the power of the estimated channel gain value.

After the average power of the estimated channel gain value is calculated, the average of the calculated average power value is produced in step 802. More specifically, the second averager receives the power value from the power calculator, and calculates and outputs the average of the received power value. That is, when the denominator value of the weight is output through the second averager, the process for producing the denominator of the weight is ended.

Figure 9:
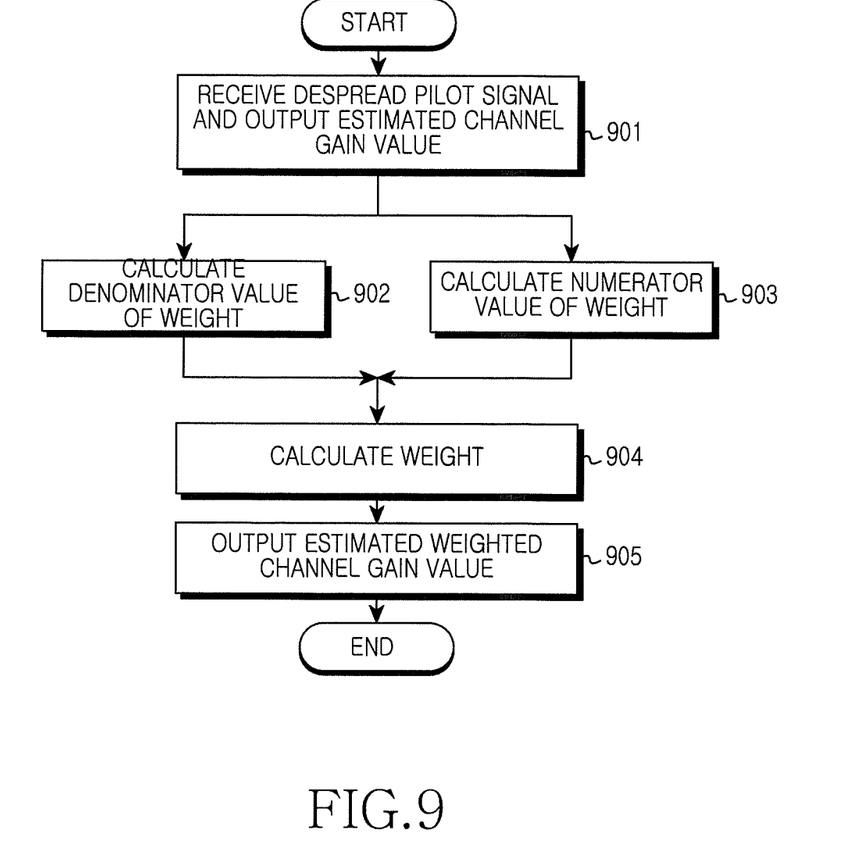
FIG. 9 is a flow diagram illustrating a process for outputting a weighted channel gain value according to an embodiment of the present disclosure.

FIG. 9 illustrates a process for producing a weighted channel gain value according to an embodiment of the present disclosure. As illustrated in FIG. 9, first, a despread pilot signal is received, and a channel gain value is produced in step 901. More specifically, the channel estimator receives the despread pilot signal from the pilot despreader and outputs an estimated channel gain value. However, the channel estimator has an estimation error in the channel gain value according to a moving speed of a terminal and a Signal-to-Noise Ratio (SNR) of an input signal. Therefore, the following process is performed to apply a weight capable of maximizing an SNR of a rake receiver, considering an estimation error in the channel gain value output from the channel estimator before the compensator compensates for the channel gain value.

Thereafter, the estimated channel gain value is received, and a denominator value of a weight is calculated in step 902. First, the power calculator calculates the average power of the estimated channel gain value. More specifically, the power calculator receives an estimated channel gain value from the channel estimator, and calculates and outputs the power of the estimated channel gain value. After the average power of the estimated channel gain value is calculated, the average of the calculated average power is output. Also, the second averager receives the power value from the power calculator, and calculates and outputs the average of the received power value. That is, when the denominator value of the weight is output through the second averager, the process for producing the denominator of the weight is ended. In this flow diagram, after the numerator value of the weight is calculated, the denominator value of the weight is calculated. However, the numerator value of the weight and the denominator value of the weight can be calculated simultaneously.

After the denominator value of the weight is calculated, the numerator value of the weight is calculated at step 903. First, the first complex conjugator receives an estimated channel gain value output from the channel estimator, and outputs a complex conjugate value of the estimated channel gain value. Thereafter, the second multiplier receives the value from the first complex conjugator and the value from the pilot despreader, and outputs the product of the received respective values. More specifically, the second multiplier receives a complex conjugate value of the estimated channel gain value from the first complex conjugator and the despread pilot signal from the pilot despreader, and outputs the product of the complex conjugate value of the estimated channel gain value and the despread pilot signal. Thereafter, the average of the product of the complex conjugate value of the estimated channel gain value and the despread pilot signal is output. Also, the first averager receives the value output from the second multiplier and outputs the average of the received value. More specifically, the first averager receives the product of the despread pilot signal and the estimated channel gain value from the second multiplier, and outputs the average of the received values. After the average of the product of the complex conjugate value of the channel gain and the despread pilot signal is output, a real number of the output average value is produced. More specifically, the realizer receives the average of the product of the complex conjugate value of the channel gain and the despread pilot signal from the first averager, and outputs a real number of the output average value. After the real number of the output average value is produced, a noise term is removed from the output real number. That is, the noise canceller receives the value from the realizer, and cancels a noise component included in a numerator value of a weight. More specifically, the third multiplier receives a noise estimation value output from the noise estimator, and outputs a value multiplied by a relevant coefficient. Thereafter, the second adder receives the value from the realizer and a minus value of the value from the third multiplier, adds the received respective values, and cancels a noise component included in the numerator value of the weight. Thereafter, the process for producing the numerator of the weight is ended.

After the numerator value and the denominator value of the weight are calculated, the weight is calculated in step 904. More specifically, the first divider receives the denominator of the weight from the noise canceller, receives the numerator of the weight output from the denominator block, and calculates the weight by dividing the value received from the noise canceller by the value received from the denominator block. A conventional receiver includes a channel estimator that estimates a channel of each path. The conventional rake receiver compensates for a channel gain value output from the channel estimator, and performs Maximum Ratio Combining (MRC). The MRC has the best effect when there is no estimation error in the channel gain value output from the channel estimator. However, the channel estimator of the conventional receiver has an estimation error in the channel gain value according to a moving speed of a terminal and a Signal-to-Noise Ratio (SNR) of an input signal. Therefore, the present disclosure applies a weight capable of maximizing an SNR of a rake receiver, considering an estimation error in the channel gain value output from the channel estimator before the compensator compensates for the channel gain value.

After the weight is calculated, an estimated weighted channel gain value is produced in step 905. More specifically, the first multiplier 205 receives the channel gain value estimated by the channel estimator 210 and the value output from the first divider 204, and outputs an estimated weighted channel gain value. In other words, the first multiplier 205 receives the weight from the first divider and the estimated channel gain value from the channel estimator, multiplies the received respective values, and outputs an estimated weighted channel gain value. Thereafter, the process is terminated.

While the disclosure has been shown and described with reference to certain exemplary embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A receiver comprising:
    a channel estimator configured to determine an estimated channel gain value by estimating a channel based on a first input signal;
    a noise estimator configured to determine a noise estimation value by estimating a noise included in the first input signal;
    a weighting block determining a weighted channel gain value by applying a weight to the estimated channel gain value, where a numerator value of the weight is determined based on the first input signal, the estimated channel gain value and the noise estimation value and a denominator value of the weight is determined based on a power of the estimated channel gain value; and
    a compensator to compensate an error of the estimated channel gain value by reflecting the weighted channel gain value based on a second input signal.

2. The receiver of claim 1, further comprising:
    a pilot despreader configured to despread the first input signal of a received signal and provide the despread first input signal to the channel estimator and
    a traffic despreader configured to despread the second input signal of the received signal and provide the despread second input signal to the compensator unit.

3. The receiver of claim 1, wherein the weighting block comprises:
    a numerator block producing the numerator value of the weight using the first input signal, the estimated channel gain value and the noise estimation value;
    a denominator block producing the denominator value of the weight from the power of the estimated channel gain value;
    a first divider configured to produce the weight from the numerator value and the denominator value of the weight; and
    a first multiplier configured to produce the weighted channel gain value from the estimated channel gain value and the weight.

4. The receiver of claim 3, wherein the numerator block comprises:
    a product block producing a product of the first input signal and a complex conjugate value of the estimated channel gain value;
    a first averager configured to obtain an average of the product generated from the product block;
    a realizer configured to produce a real number of the average generated from the first averager; and
    a noise canceller configured to cancel a noise component included in the numerator value of the weight.

5. The receiver of claim 3, wherein the denominator block comprises:
    a power calculator configured to calculate a power of the estimated channel gain value using the estimated channel gain value; and
    a second average configured to obtain an average of the power of the estimated channel gain value, and produce the denominator value of the weight.

6. The receiver of claim 3, wherein the weight is determined according to the following equation:

$$\alpha_i(k) = \frac{\operatorname{Re}\{E[x_i(k)\hat{h}_i(k)^*]\} - w(0)\sigma_{n_i}(k)^2}{E\left[|\hat{h}_i(k)|^2\right]}$$

where $\alpha_i(k)$ denotes the weight, $\operatorname{Re}\{E[x_i(k)\hat{h}_i(k)^*]\}$ denotes a real number of an average of a product of the first input signal $x_i(k)$ and a complex conjugate value $\hat{h}_i(k)^*$ of the estimated channel gain value, $w(0)\sigma_{n_i}(k)^2$ denotes a noise component, $W(0)$ denotes a $0^{th}$ coefficient, $\sigma_{n_i}(k)^2$ denotes the noise estimation value, and $E[|\hat{h}_i(k)|^2]$ denotes an average value of the power of the estimated channel gain value $\hat{h}_i(k)$, wherein k and i are integers.

7. The receiver of claim 4, wherein the product block comprises:
    a first complex conjugator configured to produce the complex conjugate value of the estimated channel gain value; and a second multiplier configured to multiply the first input signal and the complex conjugate value of the estimated channel gain value.

8. The receiver of claim 4, wherein the noise canceller comprises:
a third multiplier configured to produce a value multiplied by a relevant coefficient, using the noise estimation value outputted from the noise estimator; and
an adder configured to receive and add the value outputted from the realizer and a minus value of a value outputted from the third multiplier, and cancel a noise component included in the numerator value of the weight.

9. The receiver of claim 1, wherein the compensator unit comprises:
a second complex conjugator configured to produce a complex conjugate value, using the weighted channel gain value;
a second divider configured to produce a value obtained by dividing an output value of the second complex conjugator by a noise estimation value obtained from the noise estimator; and
a compensator configured to compensate the error of the estimated channel gain value by multiplying the value obtained by dividing the complex conjugate value by the noise estimation value and the second input value.

10. The receiver of claim 9, wherein the estimated channel gain compensation value is determined according to the following equation:

$$\frac{\alpha_i(k)}{\sigma_{n_i}(k)^2} \hat{h}_i(k)^* y_i(k)$$

where $\alpha_i(k)^2$ denotes the weight, $\sigma_{n_i}(k)^2$ denotes the noise estimation value, $\hat{h}_i(k)$ denotes a complex conjugate value of the estimated channel gain value, and $y_i(k)$ denotes the second input signal, wherein k and i are integers.

11. The receiver of claim 1, wherein the first input signal comprises a pilot signal and the second input signal comprises a traffic data signal.

12. An operation method for a receiver comprising:
determining, by a channel estimator, an estimated channel gain value by estimating a channel based on a first input signal;
determining, by a noise estimator, a noise estimation value by estimating a noise included in the first input signal;
determining a weighted channel gain value, where a numerator value of the weight is determined based on the first input signal, the estimated channel gain value and the noise estimation value, and a denominator value of the weight is determined based on a power of the estimated channel gain value of the channel estimator; and
compensating an error of the estimated channel gain value by reflecting the weighted channel gain value based on a second input signal.

13. The method of claim 12, further comprising:
despreading the first input signal of a received signal and providing the despread first input signal; and
despreading the second input signal of the received signal and providing the despread second input signal.

14. The method of claim 12, the determining of the weighted channel gain value comprises:
producing, by a numerator block, the numerator value of the weight using the first input signal, the estimated channel gain value and the noise estimation value of the noise estimator;
producing, by a denominator block, the denominator value of the weight from the estimated channel gain value;
producing, by a first divider, the weight from the numerator value of the weight and the denominator value of the weight; and
producing, by a first multiplier, the weighted channel gain value from the estimated channel gain value and the weight.

15. The method of claim 14, wherein the producing of the numerator value of the weight comprises:
producing, by a product block, a product of the first input signal and a complex conjugate value of the estimated channel gain value;
producing, by a first average, an average value of the first input signal and the complex conjugate value of the estimated channel gain value;
producing, by a realizer, a real number of the average value; and
cancelling, by a noise canceller, a noise component included in the numerator value of the weight.

16. The method of claim 14, wherein the producing of the denonminator value of the weight comprises:
calculating, by a power calculator, the power of the estimated channel gain value from the estimated channel gain value; and
obtaining, by a second averager, an average of the power value of the estimated channel gain, and producing the denominator value of the weight.

17. The method of claim 14, wherein the weight is determined according to the following equation:

$$\alpha_i(k) = \frac{\text{Re}\{E[x_i(k)\hat{h}_i(k)^*]\} - w(0)\sigma_{n_i}(k)^2}{E[|\hat{h}_i(k)|^2]}$$

where $\alpha_i(k)$ denotes the weight, $\text{Re}\{E[x_i(k)\overline{h}_i(k)^*]\}$ denotes a real number of an average of a product of the first input signal $x_i(k)$ and a complex conjugate value $\hat{h}_i(k)^*$ of the estimated channel gain value, $w(0)\sigma_{n_i}(k)^2$ denotes a noise component, $W(0)$ denotes a $O^{th}$ coefficient, $\sigma_{n_i}(k)^2$ denotes the noise estimation value, and $E[|\hat{h}_i(k)|^2]$ denotes an average value o the power of the estimated channel gain value $\hat{h}_i(k)$, wherein k and i are integers.

18. The method of claim 15, wherein the producing of the product of the first input signal and the complex conjugate value of the estimated channel gain value comprises:
producing, by a first complex conjugator, the complex conjugate value of the estimated channel gain value; and
producing, by a second multiplier, the product of the first input signal and the complex conjugate value of the estimated channel gain value.

19. The method of claim 15, wherein the cancelling of the noise component included in the numerator value of the weight comprises:
multiplying, by a third multiplier, the noise estimation value of the noise estimator by a relevant coefficient; and
cancelling, by an adder, a noise component included in the numerator value of the weight by adding the real number of the average value and the minus of the value which is obtained by multiplying the noise estimation value by the relevant coefficient.

20. The method of claim 12, wherein the compensating of the error of the estimated channel gain value comprises:
producing, by a second complex conjugator, a complex conjugate value from the weighted channel gain value;

producing, by a second divider, a value obtained by dividing the complex conjugate value by the noise estimation value; and compensating the error of the estimated channel gain value by multiplying the value obtained by dividing the complex conjugate value by the noise estimation value and the second input value.

21. The method of claim 20, wherein the compensating of the error of the estimated channel gain value is determined according to the following equation:

$$\frac{\alpha_i(k)}{\sigma_{n_i}(k)^2} \hat{h}_i(k)^* y_i(k)$$

where $\alpha_i(k)$ denotes the weight, $\sigma_{n_i}(k)^2$ denotes the noise estimation value, $\hat{h}_i(k)^*$ denotes a complex conjugate value of the estimated channel gain value, and $y_i(k)$ denotes the second input signal, wherein k and i are integers.

22. The method of claim 12, wherein the first input signal comprises a pilot signal and the second input signal comprises a traffic data signal.

* * * * *